Patented Feb. 15, 1927.

1,617,701

UNITED STATES PATENT OFFICE.

PIO CACCIA, OF NEW YORK, N. Y.

DIURETIC PRODUCT AND PROCESS OF MAKING THE SAME.

No Drawing.   Application filed August 7, 1925. Serial No. 48,865.

My invention relates generally to therapeutic compounds and has for its object the production of a product, diuretic in nature, consisting of the reaction product of amylase and secretin. My new product differs from secretin in that whereas secretin increases the acidity of the blood and produces oliguria, my product tends to make the blood more alkaline and is diuretic.

I will now describe in detail a preferred manner of carrying out my invention as I have actually employed it.

As a first step I treat ordinary powdered secretin with an acid solution of hydrochloric acid, so that after the addition of a very small quantity of amylase the liquid is slightly acid. I then add a small quantity of toluene, or sodium fluoride, as an antiseptic to prevent the production of bacteria, and allow the mixture to stand at a temperature of forty degrees centigrade for one day. The receiver must be well stopped and the antiseptic volatilized. If the temperature is raised to fifty degrees centigrade the time necessary will be only five or six hours.

In order to destroy the enzyme and evaporate the toluene heat is applied. The solution is then filtered and the filtrate used hypodermically, or concentrated to a small volume, put in ampules and sterilized, or made in dried form, in powder or tablet with the addition of an organic acid to preserve it.

In preparing the composition I use the ingredients in about the following proportions:

One liter of acid solution, 15 grams of powdered secretin and five cc. of toluene. The addition of the quantities of amylase is related with its activity. The total acidity is about 0.02% or 0.04% of HCl.

Instead of using powdered secretin, I also took the entire duodenum of an animal, turned same inside out and placed it in an electric oven at fifty degrees centigrade for approximately five hours. Then I cut it into small pieces, dried at 100 C. and powdered it, and for every 20 grams I treated with 100 cc. solution of 0.4% of hydrochloric acid. After standing over night the mixture was brought slowly to a boiling point and boiled for several minutes, and then neutralized with 10% solution of sodium hydroxide, while boiling and again rendered it slightly acid with glacial acetic acid. After boiling for about 10 minutes the preparation was filtered; the liquid was clear. Sufficient glacial acetic acid was added to make it 2% acid by volume and the acid extract was evaporated to dryness. In this case it was the amyloptic enzyme of the duodenum which transformed the secretin into katabolin.

I claim:

1. A diuretic product consisting of the reaction product of amylase and secretin which product has the physiological characteristic of reducing acidosis.

2. The process of making a diuretic product which consists in treating secretin with amylase in slight acid medium.

PIO CACCIA.